3,642,983
METHOD OF PREPARING INJECTABLE LIVER EXTRACTS
Marino Roberto Viola, Viguzzolo, Alessandria, Italy, assignor to Laboratorio Chimico Farmaceutico E. Granelli S.p.A., Milan, Italy
No Drawing. Filed Feb. 4, 1969, Ser. No. 796,573
Claims priority, application Italy, Apr. 1, 1968, 51,135/68
Int. Cl. A61k *17/00*
U.S. Cl. 424—106                           7 Claims

ABSTRACT OF THE DISCLOSURE

A method for preparing an injectable liver extract comprising the following steps:
(a) wherein ground liver is first digested and dispersed in water acidified by sulfuric acid having a pH in the range of from 5.3 to 5.8;
(b) whereupon the liquid phase is concentrated and deprived of its proteic fraction for oral administration by precipitation with an organic solvent, the dissolved matter being recovered for preparing therefrom, an injectable aqueous solution;
(c) said method being characterized in that the digestion step is carried out in a temperature range of from 45° C. to 50° C. for a period of from 5 to 8 hours, followed by filtering said dispersion, whereafter the liquid phase is concentrated in the vacuo at a temperature not exceeding 35° C., to a dry matter content of from 13% to 18% by weight, and subjected to deproteinization by treatment with acetone at a temperature of 15° C. to 25° C., thereafter separating said proteic fraction for oral administration through filtration, the resulting aqueous-acetonic solution being deprived of acetone by concentration through evaporation at a temperature not exceeding 32° C.

BACKGROUND OF THE INVENTION

Field of the invention

This invention relates to the preparation of injectable liver extracts for use in human therapy.

Description of the prior art

A method, which may be termed a "pioneer" in the art of preparing liver extracts for use in human therapy is disclosed by U.S. Pat. 2,125,844 issued in 1938 to H. L. Keil.

The subsequent development in the preparation of such extracts is witnessed by U.S. Pat. 2,901,396, British Pat. 882,588 and German Pat. 1,089,509. The solutions proposed by these patents are undoubtedly valid under certain aspects but, what is of greatest practical importance, they have not succeeded in acceptably reconciling two fundamental requirements: (a) high standard of the product and (b) commercial convenience of the process. Thus, actually, therapeutically useful liver extracts are still now being conveniently prepared by the method indicated by H. L. Keil, yielding both an injectable extract and a proteic fraction for oral administration, said method being, however, modified substantially as follows.

Bovine livers are finely ground and dispersed in water, the resulting suspension is brought to a pH-value of 5.5 by addition of sulphuric acid, then progressively heated to 75–80° C. in order to coagulate an undesirable proteic fraction. The hot suspension is filtered and the clear filtrate is concentrated to a paste having a dry matter content of about 60–70% by weight. This paste is dispersed in ethyl alcohol to a dispersion containing 70% by weight ethanol, thereby separating a proteic fraction suitable for oral administration, the injectable matter remaining in the aqueous-alcoholic phase. This phase is filtered off and concentrated in vacuo till full removal of ethanol and obtention of a paste having about 70% dry matter content. This paste is dissolved in distilled water to a solution of about 20% dry matter content, the resulting solution being treated, if necessary, with an ion-exchange resin in order to remove the excess histamine. The pH-value is subsequently readjusted, if necessary, to about 5.5 and the solution is diluted with distilled water to a dry matter content of about 10% by weight. The diluted solution is admixed with 0.5% phenol (or other preserving agent) and submitted to analytic control, whereafter the injectable doses are prepared. The solution is very dark, of a reddish-brown to brown-black color.

As far as the injectable liver extracts prepared in the abovementioned manner are concerned, at least the following objections can be raised. Firstly, as is well known not only to expects but also to patients, extract livers in vials exhibit after a more or less long storage period a flocculate or precipitate, the presence of which is seldom tolerated by the patient and is even forbidden by rules in force in a number of countries. In order to obviate this drawback liver extracts in solution are allowed to "season" by decanting in suitable vessels, at the bottom of which a more or less consistent precipitate is collected. Seasonning is in certain cases even accelerated by alternate hot-cold treatments.

On the other hand, what is by far more relevant and of concern to the expert is that (as has now been ascertained) liver extracts prepared in the above-described manner actually contain a relatively small fraction only of the overall available amount of active principles (vitamins of group B, aminoacids, nucleotides, etc.) which are present in the starting liver and may be extracted to injectable form; at the same time, though thoroughly healthy livers of freshly slaughtered animals are employed, the operator is frequently confronted with relatively high histamine contents in the extract, which necessitate a dehistaminating treatment by means of ion-exchange resins.

SUMMARY OF THE INVENTION

This invention provides a method of preparing injectable liver extracts which avoids the abovementioned drawbacks.

More particularly, having regard to the prior art, the invention provides a method of preparing injectable liver extracts, wherein a ground liver is dispersed and digested in water acidified by sulphuric acid, whereupon the liquid phase is concentrated and deprived of its proteic fraction for oral administration by treatment with an organic solvent, and the dissolved matter is recovered for preparing therefrom an aqueous injectable solution, said method being characterized in that the digestion step is carried out at a temperature of 45° C. to 50° C. (preferably 45° C.), whereafter the liquid phase is concentrated at a temperature not exceeding 35° C. to a dry matter content of 13% to 18% (preferably 15%) by weight of dry matter content, and submitted (while stirring) to deproteinization by means of acetone at a temperature of 15° to 25° C. thereby to separate the said fraction for oral use, and the resulting aqueous-acetonic solution is deprived of acetone by concentrating at a temperature not exceeding 32° C.

Further characteristic features and advantages of the invention will be understood from the following description.

DETAILED DESCRIPTION OF THE INVENTION

At a first stage of the process a bovine animal liver is ground and dispersed in demineralized water admixed with sulphuric acid in a proportion such that the pH-value of the dispersion is from 5.3 to 5.8 (preferably 5.5). The dispersion is stirred and heated to 45°–50° C. during a period of 5 to 8 hours (typically 7 hours) until a substantial digestion has taken place. The end of this operational stage is denoted by a uniformly highly fluid aspect of the mass.

Upon completion of digestion the dispersion is cooled to a temperature of 2°–10° C., typically about 5° C. and filtered, the filtrate being an opalescent solution. Filtering could even be carried out at elevated temperature, without cooling; however, cooling of the solution more particularly if carried out in a period of about 12 hours, facilitates the separation of the liquid extract from the proteic mass.

The resulting opalescent solution is concentrated in vacuo at a temperature not exceeding 35° C. (preferably not exceeding 30° C.) to a dry matter content of 13% to 18% by weight, preparatory to deproteinization with acetone. The deproteinization with acetone is carried out while maintaining the solution at 15° to 25° C., preferably 18° C. and adding acetone (at the same temperature) thereto in a proportion of 100 parts by volume acetone to 50–70 volume parts, typically 66 parts aqueous solution, while stirring. Beyond these limits the yield appreciably sinks. Stirring is continued during about two hours, care being taken to possibly maintain a temperature not exceeding 18° C., followed by cooling down to −8° C. to −12° C., typically −10° C. during a period of 12 hours at least. At the end of this period the precipitation of the proteic fraction for oral use may be held to be practically completed. The precipitate may be separated by filtration. Typically, the filtrate should consist of a clear aqueous-acetonic solution; if the solution is not clear, filtering may be repeated with the use of small amounts of filtering earths of perlitic nature such as Dicalite 478 (R.T.M. for a perlitic filter aid).

As mentioned hereinbefore, acetone is removed from the solution at this stage by concentrating at a temperature not exceeding 32° C., preferably not exceeding 30° C.

After removal of acetone the resulting concentrated aqueous solution is again opalescent and unusually rich in such valuable components as aminoacids, nucleotides and vitamins of Group B (prevailingly $B_{12}$ and $B_1$), as will be clearly evidenced by the examples hereinafter. However, just because of the high contents of said valuable components, it would be practically impossible for this solution (or the product deriving e.g. from its dilution to 10% dry matter content) to avoid flocculations or precipitations during storage. Therefore, according to a further aspect of the invention, the solution is further processed in order to obtain as a final product a lyophilized extract readily soluble in bidistilled water at the time of use. Accordingly, the abovementioned concentrated solution is first brought by means of water to a dilution suitable for its sterilizing and depyrogenating filtering, chiefly for its lyophilization, which latter may be carried out on the whole volume of the solution or on the solution subdivided into doses (as determined by the results of the final analysis). The best suited dilution corresponds to 8–12% by weight dry content, preferably 10% by weight. The dilute solution contains a preserving agent. Volatile preserving agents such as phenols, cresols and benzyl alcohol are unsuitable, in that they would volatilize in the course of lyophilization and would thereby give rise to disturbances in the apparatus. Suitable preserving agents are of low volatility, such as sodium ethylmercurythiosalicylate and p-hydroxybenzoates.

Thus, for instance, methyl p-hydroxybenzoate, which is available in the trade i.a. under the trade name "Parametil" can be employed. A highly advantageous preserving agent consists of a synergic mixture (known in the trade as "Paracombin") consisting of:

| | Percent by weight |
|---|---|
| Methyl p-hydroxybenzoate | 35 |
| Ethyl p-hydroxybenzoate | 35 |
| Propyl p-hydroxybenzoate | 10 |
| n-Butyl p-hydroxybenzoate | 10 |
| Benzyl p-hydroxybenzoate | 10 |

Before adding the preserving agent, the solution may be filtered, if necessary; after adding the preserving agent it is filtered on an abacteric filter (typically "Membranfilter" or "Millipore") to thereby sterilize it and remove any pyrogenous substances. At this stage, if necessary, the solution (which is colored yellow-gold) may be stored in a refrigerator at about 5° C., more particularly pending its analysis. On completion of the analysis the solution is lyophilized as such or in doses determined by the analysis. A pre-freezing temperature of only −20° C. with a temperature at the condenser of about −60° C. is sufficient for lyophilization. The lyophilized extract is storage-stable over a practically infinite period of time.

The yield of the process described above is as an average of 9–10 kg. dry extract per 100 kg. liver and is therefore higher by over 50% with respect to the prior commercial method.

TYPICAL ANALYSIS

| | Lyophilized liver extract obtained by the invention | Injectable liver extract obtained by the prior method |
|---|---|---|
| Total nitrogen, percent | 9.8 | 12 |
| Amino-nitrogen, percent | 4 | 4 |
| Cytidylic acid, percent | 1 | (a) |
| Uridylic acid, percent | 0.15 | (a) |
| Guanilic acid, percent | 0.18 | (a) |
| Folic acid, mcg./g. | 1 | (b) |
| Pantothenic acid (expressed as Ca pantothenate), mcg./g. | 400 | 100 |
| Choline (expressed as choline.HCl), mg./g. | 10 | 2 |
| Vitamin $B_{12}$, mcg./g. | 0.7 | (b) |
| Vitamin PP, mcg./g. | 150 | 30 |
| Vitamin $B_1$, mcg./g. | 20 | 5 |
| Histamine, mcg./g. | 10 | 100 | a Below measurable limit. b Traces.

Example 1

Starting material: bovine liver taken on slaughtering from a young Simmenthal bull aged 14 months, overall weight 600 kg.

1,965 g. liver are ground on a mincer (outlet holes 5 mm. in diameter) and suspended in 3,930 ml. demineralized water acidified by 6.5 ml. 95% sulphuric acid. The suspension is stirred, heated to 45° C. and maintained under these conditions during 5 hours. The pH-value amounts to 4.5–4.6. The mass is cooled to +5° C. and filtered in vacuo, an opalescent yellow filtrate being obtained. The filtrate is placed by a side, the scrow left on the filter is taken up with 3,000 ml. demineralized water and again digested during one hour as above and filtered. The two filtrates are brought together, thereby obtaining a total of 6,500 ml. filtrate of pH=4.6. Concentration in vacuo is carried out in a cyclone evaporator at a maximum temperature of the liquid of 34°–35° C. to obtain 1,900 g. solution with a dry matter content of 16% by weight; 2,660 ml. acetone are added while stirring and a brown muddy precipitate is formed. Stirring is continued during about two hours at a temperature of 18° C. Cooling is effected to −8° C., followed by filtering in vacuo on a Dicalite 478 (manufactured by Dicalite Europe Sud) panel. A clear yellow-gold solution is obtained. Acetone is removed in a cyclone evaporator, the maximum temperature of the liquid on completion of concentration amounting to 30° C. The concentrated solution is frozen to −20° C. and lyophilized, thereby yielding 186 g. (9.48% yield on the starting liver) of water-soluble dry extract.

The resulting extract exhibited on analysis:

Total nitrogen—10%
Amino-nitrogen—4.1%
Cytidylic acid—0.9%
Uridylic acid—0.15%
Guanilic acid—0.18%
Folic acid—1 mcg./g.
Pantothenic acid (expressed as Ca pantothenate)—400 mcg./g.
Choline (expressed as choline HCl)—10 mcg./g
Vitamin $B_{12}$—1 mcg./g.
Vitamin PP—150 mcg./g.
Vitamin $B_1$—20 mcg./g.
Histamine (base)—8 mcg./g.

Example 1bis (comparative)

Starting material: bovine liver taken on slaughtering from the same animal as in Example 1 and preserved in frozen condition at a temperature of −25° C. till the time of use.

1,662 g. liver (after defrosting) are ground on a mincer (outlet holes 5 mm. in diameter) and suspended in 3,324 ml. "aqua fontis." The suspension is agitated and admixed with 2 ml. 95% sulphuric acid. The pH-value of the suspension amounts to 5.3–5.4.

The temperature is raised to 85° C. within about 60 min. On reaching this temperature the suspension is filtered yielding 3,460 ml. clear yellow-reddish filtrate. The pH-value of the filtrate amounts to 5.7.

The filtrate is concentrated in vacuo to a paste having a dry matter content of about 70% by weight; during the concentration in vacuo a final temperature of the paste of 75° C. is reached.

The paste is cooled to room temperature and admixed while stirring with a 95% ethyl alcohol to obtain an aqueous-alcoholic solution containing 70% ethyl alcohol. A further addition of alcohol yields a copious precipitate. The precipitate is decanted and the supernatant liquid is filtered. The clear aqueous-alcoholic filtrate is concentrated in vacuo to a paste of about 70% dry matter content. This paste is the injectable fraction of the liver extract. It is dried in an oven in vacuo on shelves heated to 70° C. (by means of hot water); 50 g. of a dry, brown-reddish product are obtained. The yield amounts therefore to about 3% of the starting liver weight.

The extract obtained showed on analysis:

Total nitrogen—11%
Amino-nitrogen—4%
Cytidylic acid—Below measurable limit
Uridylic acid—Below measurable limit
Guanilic acid—Below measurable limit
Folic acid—Traces
Pantothenic acid (expressed as Ca pantothenate)—105 mcg./g.
Choline (expressed as choline HCl)—2.1 mcg./g.
Vitamin $B_{12}$—Traces.
Vitamin PP—35 mcg./g.
Vitamin $B_1$—5.7 mcg./g.
Histamine (base)—95 mcg./g.

Example 2

Starting material: bovine liver taken on slaughtering from a young Simmenthal bull aged 17 months, overall weight 680 kg.

2,676 g. liver ground as in Example 1 are dispersed in 7,350 ml. demineralized water admixed with 8.85 ml. 95% sulphuric acid. The digestion is carried out as in Example 1; however, the mass is heated to 50° C., its pH-value being 4.9–5. 6,600 ml. yellow-brown opalescent filtrate are obtained. The scrow left on the filter is again digested twice with 3,000 ml. demineralized water at a time, as in Example 1. A total of 12,710 ml. filtrate is obtained and concentrated in vacuo without ever exceeding a temperature of 35° C., till 2,872 g. of a solution of 13.6% dry matter content are obtained. 4,140 ml. of acetone are added while stirring, the further procedure being similar to that described in Example 1.

265 g. of a lyophilized product are obtained, the yield being of 9.9% with respect to the starting liver weight.

The resulting extract showed on analysis:

Total nitrogen—9.8%
Amino-nitrogen—4%
Cytidylic acid—0.7%
Uridylic acid—0.12%
Guanilic acid—0.15%
Folic acid—0.9 mcg./g.
Pantothenic acid (expressed as Ca pantothenate)—350 mcg./g.
Choline (expressed as choline HCl)—9 mcg./g.
Vitamin $B_{12}$—1.2 mcg./g.
Vitamin PP—155 mcg./g.
Vitamin $B_1$—18 mcg./g.
Histamine (base)—6.5 mcg./g.

Example 3

Starting material: bovine lover taken on slaughtering from a young bull of brown Alpine race aged 23 months, overall weight 710 kg.

2,425 g. ground liver as in Example 1 are dispersed in 4,850 ml. demineralized water admixed with 8 ml. 95% sulphuric acid. The suspension is stirred and its temperature is gradually raised to 45° C., these conditions being maintained during 8 hours; pH=4.5. Subsequently the suspension is placed overnight in a refrigerator at 5° C.

Room temperature is re-established, 2,000 ml. demineralized water is added and the suspension is heated during one hour to 45° C. while stirring and filtered hot in vacuo on a Dicalite 478 panel; an almost clear yellow filtrate is obtained. The scrow left on the filter is taken up with 2,000 ml. demineralized water and again digested during one hour under the above-described conditions; the filtrates are brought together, a total of 8,670 ml. filtrate of pH=4.5 being obtained. The filtrate is concentrated in vacuo in a cyclone evaporator at 35° C. till 2,840 g. of a solution of dry matter content of 12.2% is obtained. 4,135 ml. acetone are added while stirring, the further procedure being as described in Example 1.

202 g. injectable product are obtained representing an 8.35% yield with respect to the starting liver.

The resulting extract showed on analysis:

Total nitrogen—9.3%
Amino-nitrogen—3.8%
Cytidylic acid—0.7%
Uridylic acid—0.11%
Guanilic acid—0.14%
Folic acid—0.7 mcg./g.
Panotothenic acid (expressed as Ca pantothenate)—360 mcg./g.
Choline (expressed as HCl choline)—8.8 mcg./g.
Vitamin $B_{12}$—0.9 mcg./g.
Vitamin PP—140 mcg./g.
Vitamin $B_1$—17 mcg./g.
Histamine (base)—7.2 mcg./g.

Example 4

Starting material: bovine liver taken on slaughtering from the same animal as in Example 3 and preserved by freezing at −25° C. till the time of use.

2,000 g. defrosted liver are ground on a mincer (outlet holes 3 mm. in diameter) and suspended in 9,000 ml. demineralized water acidified with 6.6 ml. 95% sulphuric acid, the temperature being gradually raised to 45° C. while stirring. The digestion is carried out in an inert gas (nitrogen) stream during 10 hours, followed by filtering as described in Example 3; a total of 8,600 ml. almost clear yellow filtrate o f pH=4.4 is obtained.

The filter cake is washed with small portions of demineralized water at 45° C., a total of 1,000 ml. being employed; concentration is then carried out in vacuo in a cyclone evaporator at 30° C. till 2,010 g. of a solution having a dry matter content of 12.9% are obtained. 2,950 ml. acetone are added while stirring, the further procedure being as described in Example 1.

200 g. lyophilized extract are obtained, representing a 10% yield with respect to the starting liver weight.

The resulting extract showed on analysis:

Total nitrogen—10.2%
Amino-nitrogen—4.5%
Cytidylic acid—1.1%
Uridylic acid—0.16%
Guanilic acid—0.19%
Folic acid—1.1 mcg./g.
Pantothenic acid (expressed as Ca pantothenate)—405 mcg./g.
Choline (expressed as choline HCl)—10.2 mcg./g.
Vitamin $B_{12}$—0.7 mcg./g.
Vitamin PP—155 mcg./g.
Vitamin $B_1$—22 mcg./g.
Histamine (base)—7.5 mcg./g.

The analytical data tabulated in the examples above were obtained by methods described by literature, more particularly:

(1) Amino nitrogen: M. Caleffi, F. Dal Brollo, E. Mecarelli, E. Rossi "Metodo di determinazione dell'azoto amminico negli estratti epatici" (Method of determining amino-nitrogen in liver extracts); Farmaco, 14, 233 (1959).

(2) Total nitrogen: Farmacopea Ufficiale Italiana (Official Italian Pharmacopea); 7th edition, appendix No. 46, page 1006.

(3) Cytidylic, uridylic, guanilic acids: J. Am. Chem. Soc. 72, 1471 and 2811 (1950); Nature 167, 483 (1951).

(4) Choline: NF XI page 416.

(5) Vitamin $B_{12}$: Microbiological method on a plate employing as test germ *E. Coli* 113/3 (Salvini Bolzoni—Boll. Inst. Sier. Milanese 31, 97 (1952). The extraction and dilutions were carried out in accordance with U.S.P. XVI as applied to liver preparations.

(6) Vitamin PP (nicotinic acid): Microbiological method on a plate, the sensitive strain being the *Aspergillus nidulans*.

Princivalle, Caradonna—Rendiconti Instituto Superiore Sanità 26, 75 (1963).

(7) Folic acid: Microbiological method employing as a sensitive strain *Streptococcus lactis* R, A.T.C.C. 8043. The titrating method is described in the Italian Official Pharmacopea, VII edition, page 1870.

(8) Pantothenic acid: Microbiological method employing as a sensitive strain *Lactobacillus arabinosus* 17-5. The titrating method is described in "Methods of Vitamin Assay"—Interscience Publ. Inc., New York, 3rd edition, page 197 (1966).

(9) Vitamin $B_1$: Microbiological method employing as a germ test the *Lactobacillus fermenti* 36. Method indicated in Difco Manual, 9th edition, pages 214 and 217 (1953).

(10) Histamine: Biological determination according to D. Glick, "Methods of Biochemical Analysis," vol. III, Interscience Publishers, Inc., New York–London, 62–71, 1966.

Example 5

200 g. lyophilized liver extract (from the procedure described in Example 4) are dissolved in 1,000 ml. apyrogenous bidistilled water.

2 g. "Paracombin" are separately dissolved in 200 ml. of bidistilled apyrogenous water while heating to about 80° C.

The resulting solution is added to the solution containing the liver extract, stirred and filtered in vacuo on a clarifying filter of the Seitz K7 type. The filter cake is washed with about 150 ml. bidistilled apyrogenous water. The resulting filtrate is transferred to sterile chamber and filtered (by employing sterile and apyrogenous glassware) on a sterilizing and depyrogenating filter (Membranfilter, Gruppe MF 30).

By washing the filter, still with bidistilled apyrogenous water, the volume of the filtrate is brought to a total of 2,000 ml. containing 10% dry matter.

The resulting solution is delivered by means of an automatic pipette machine to vials of 8 ml. capacity 2.5 ml. being allotted to each vial. The vials are of the flat bottom type for lyophilization purposes of neutral glass of the Jena type.

The vials are placed (still in sterile chamber) into a refrigerator at −20° C. to effect quick freezing of the solution. After dwelling about 12 hours (overnight) in the refrigerator, the frozen vials are placed into a lyophilizing apparatus, the shelves of which have been previously cooled down to −25° C. The lyophilizing apparatus is then connected to vacuum till a residual pressure of about 0.1 mm. mercury column is obtained in the sublimation chamber.

Heating of the shelves is started so as to reach a final temperature of 45° C. after 24 hours. On completion of lyophilization (the residual pressure amounting to about 0.001 mm. merculy column) the vials are discharged and sealed, still in the sterile chamber.

About 800 vials are obtained. A sample of this batch is subjected to chemical, microbiological and toxicological analysis before use in therapy. The storage life of the vials is practically infinite.

For actual use "solvent-vials" are additionally employed containing 2.5 ml. apyrogenous setrile bidistilled water, in order to dissolve the lyophilized extract at the time of use.

Against the practice with liver extracts obtained by the conventional commercial method lyophilization of the present liver extracts does not require the use of glycol as inert support for the lyophilized product. This is a further advantage, above all from a therapeutical point of view, inasmuch as the injectable solution which is obtained by dissolving the lyophilized product in the contents of the solvent vial is free from the peculiar disadvantages of hypertonic solutions.

What I claim is:

1. A method for preparing an injectable liver extract comprising the following steps:
    (a) wherein ground liver is first digested and dispersed in water acidified by sulfuric acid having a pH in the range of from 5.3 to 5.8;
    (b) whereupon the liquid phase is concentrated and deprived of its proteic fraction for oral administration by precipitation with an organic solvent, the dissolved matter being recovered for preparing therefrom, an injectable aqueous solution;
    (c) said method being characterized in that the digestion step is carried out in a temperature range of from 45° C. to 50° C. for a period of from 5 to 8 hours, followed by filtering said dispersion, whereafter the liquid phase is concentrated in the vacuo at a temperature not exceeding 35° C., to a dry matter content of from 13% to 18% by weight, and subjected to deproteinization by treatment with acetone at a temperature of 15° C. to 25° C., thereafter separating said proteic fraction for oral administration through filtration, the resulting aqueous-acetonic solution being deprived of acetone by concentration through evaporation at a temperature not exceeding 32° C.

2. The method of claim 1 wherein the digestion step is carried out at a temperature of 45° C.

3. The method of claim 1 wherein the dry matter content is 15%.

4. The method of claim 1 wherein the duration of the digestion step is 7 hours.

5. The method of claim 1, wherein said solution deprived of acetone by concentration through evaporation is diluted with water to a dry matter content of from 8% to 12% by weight, and mixed with a non-volatile preserving agent selected from the group consisting of sodium ethyl mercury-thiosalicylate, a p-hydroxybenzoate, and mixtures of p-hydroxybenzoates.

6. The method of claim 5 wherein the dry matter content is 10%.

7. The method of claim 5 wherein the p-hydroxybenzoates are members selected from the group consisting of methyl-p-hydroxybenzoate, ethyl-p-hydroxybenzoate, propyl - p-hydroxybenzoate, n-butyl-p-hydroxybenzoate, and benzyl-p-hydroxybenzoate.

References Cited

UNITED STATES PATENTS

| | | | |
|---|---|---|---|
| 1,796,027 | 3/1931 | Iscovesco | 424—106 |
| 2,125,844 | 8/1938 | Keil | 424—106 |
| 2,594,314 | 4/1952 | Koniuszy | 424—106 |

FOREIGN PATENTS

| | | | |
|---|---|---|---|
| 250,230 | 1/1927 | Great Britain | 424—106 |

ALBERT T. MEYERS, Primary Examiner

F. E. WADDELL, Assistant Examiner